United States Patent [19]
Cohen

[11] Patent Number: 4,503,114
[45] Date of Patent: Mar. 5, 1985

[54] LAMINATED ADHESIVE BACKING FOR MIRRORS

[75] Inventor: Lewis Cohen, Hingham, Mass.

[73] Assignee: Venture Tape Corp., Weymouth, Mass.

[21] Appl. No.: 404,314

[22] Filed: Aug. 2, 1982

[51] Int. Cl.³ .......................... B32B 7/00; D03D 3/00
[52] U.S. Cl. ................................. 428/247; 156/179; 428/252; 428/296; 428/343; 428/354; 428/912.2
[58] Field of Search ............... 428/110, 111, 247, 252, 428/255, 296, 343, 354, 196, 198, 195, 904.4, 912.2; 156/179

[56] References Cited

U.S. PATENT DOCUMENTS

| | | | |
|---|---|---|---|
| 2,851,389 | 9/1958 | Lappala | 428/247 |
| 3,616,130 | 10/1971 | Rogosch et al. | 428/110 |
| 4,101,359 | 7/1978 | Faillot | 428/110 |

FOREIGN PATENT DOCUMENTS

| | | | |
|---|---|---|---|
| 698684 | 10/1953 | United Kingdom . | |
| 822884 | 8/1955 | United Kingdom . | |
| 778772 | 7/1957 | United Kingdom . | |
| 778798 | 7/1957 | United Kingdom . | |
| 812517 | 4/1959 | United Kingdom | 428/354 |

*Primary Examiner*—James J. Bell
*Attorney, Agent, or Firm*—Wolf, Greenfield & Sacks

[57] ABSTRACT

A laminated, adhesive backing material for application to the rear surface of mirrors to prevent shattering thereof. The backing material of this invention is a three layer laminate which includes a central reinforcing layer sandwiched between two outer layers. The central reinforcing layer typically includes a polyester scrim, while the two outer layers typically are formed of polypropylene. An adhesive layer is provided on the outer surface of one of the outer layers of the laminate. The backing of this invention exceeds a 400 foot/pound test requirement. This backing material is manufactured by heat sealing the central reinforcing layer between the two outer layers and thereafter applying the adhesive to the outer surface of one of the outer layers.

8 Claims, 4 Drawing Figures

LAMINATED ADHESIVE BACKING FOR MIRRORS

FIELD OF THE INVENTION

This invention relates generally to adhesive backings and more particularly concerns an adhesive tape for use as a mirror backing.

BACKGROUND OF THE INVENTION

Mirrors, particularly large mirrors for household use such as wardrobe mirrors, are subject to breakage and shattering when struck. Obviously, the risks to persons positioned near the mirror when it breaks are great if the glass is allowed to shatter and fly apart, and the resulting debris is difficult to clean up without injury. In order to protect the users of such mirrors, an adhesive backing material is provided to the mirror which prevents the glass from shattering if the mirror is broken. This adhesive backing material holds the glass together for a sufficient period to facilitate disposal thereof.

Backings for such mirrors commonly are tested by allowing a suspended object of a predetermined weight to be swung from a given distance against a mirror disposed in a generally vertical orientation. The larger the weight, or the greater the given distance, the greater the amount of force the backing must withstand to prevent the glass from shattering. Most existing adhesive backings used for such purposes will withstand only a 100 foot/pound test and are incapable of withstanding a 400 foot/pound test. In a 100 foot/pound test, a 100 pound weight is suspended from a point above a vertically oriented mirror and is allowed to swing about the point towards the mirror from a distance of one foot. In the 400 foot/pound test a 100 pound weight is allowed to swing towards the mirror from a distance of four feet. If the mirror breaks and the backing tears or separates more than six inches, allowing the glass to fly apart, the backing has not withstood the required test.

Most such backings presently used are dispensed as an adhesive tape from a roll. Such tapes are generally formed as a single layer of polyethylene having a pressure sensitive adhesive disposed on one side thereof.

SUMMARY OF THE INVENTION

An object of this invention is to provide an adhesive backing material for mirrors capable of withstanding a 400 foot/pound test.

A further object of this invention is to provide an adhesive backing material for mirrors which is capable of withstanding a 400 foot/pound test, which is easily dispensed from a roll and which is inexpensively formed.

In accordance with the above objects, a mirror backing material capable of withstanding a 400 foot/pound test is formed as a three layer laminate. This laminated backing material includes a central reinforcing layer sandwiched between two outer layers. The central reinforcing layer typically is a polyester scrim, while the outer layers are formed of a plastic material such as polypropylene, and the scrim is typically heat sealed between the two layers of polypropylene. An adhesive layer is provided on the outer surface of one of the polypropylene layers.

The mirror backing material of this invention is formed by a process and apparatus in which the polyester scrim is roller fed between two layers of polyethylene which are then heat sealed together. Thereafter, the adhesive layer is applied to one surface thereof, and the resulting tape is accumulated on a roll and cut to size.

DESCRIPTION OF THE DRAWING

The objects, advantages and features of this invention will be more clearly appreciated from the following detailed description taken in conjunction with the accompanying drawing in which.

DETAILED DESCRIPTION OF THE PREFERRED EMBODIMENT

Figure 1:
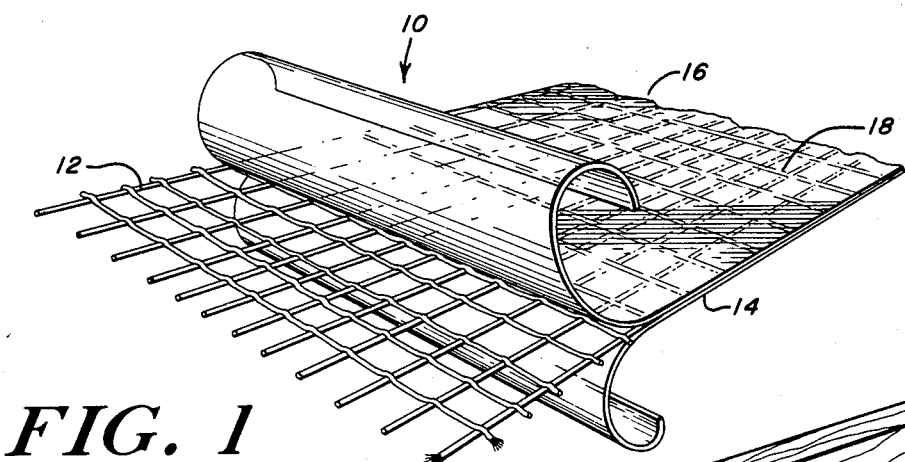
FIG. 1 is a pictorial representation of the backing material of this invention in a partially delaminated condition.
Figure 2:
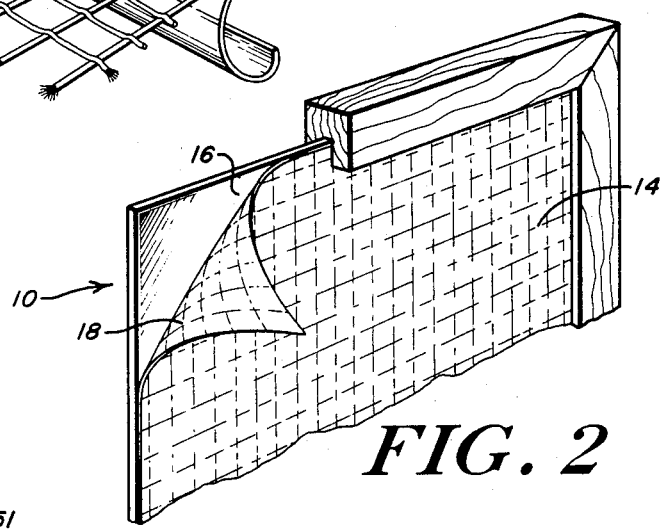
FIG. 2 shows the backing material of FIG. 1 as applied to the back of a mirror.

With reference now to FIG. 1, the mirror backing material of this invention will be described. Material 10 includes a central reinforcing layer 12 sandwiched between two outer layers 14 and 16. Reinforcing layer 12 typically is a scrim which may be formed of polyester, and layers 14 and 16 are secured together to seal reinforcing layer 12 therebetween. Outer layers 14 and 16 typically are formed of a plastic material, such as a polypropylene, which can be heat sealed to itself, or which permits layers 14 and 16 to be secured together by means of an adhesive. The outwardly facing surface of layer 16 is typically provided with a pressure sensitive, self-crosslinking acrylic adhesive layer 18. Adhesive layer 18 allows material 10 to be readily and securely applied to the back of a mirror as shown in FIG. 2, and layer 18 allows material 10 to be stored and dispensed in a roll without loss of adhesive strength. A release coating such as a silicone coated paper may also be used in conjunction with the material to allow storage thereof in other than a roll form. However, a self releasing adhesive without a release coating is preferred.

Material 10 of this invention is capable of withstanding a 400 foot/pound test. This superior strength is produced by the laminated nature of the tape as described herein.

Typically, reinforcing layer 12 is a scrim formed of 1000 denier polyester thread woven into a square grid of four warp and four fill per square inch. In a preferred embodiment, layer 12 has a tensile strength of about 35 pounds in the machine direction and about 38 pounds in the cross direction and can be purchased from Bay Mills Co., Tonawanda, N.Y. In this preferred embodiment, layers 14 and 16 are each formed of a polypropylene film coated with a Surlyn heat sealable coating and having a 70 gauge thickness, a tensile strength in the machine direction of about 10 pounds and in the cross direction of about 13 pounds, and a Mullen Burst of 33 to 34. This film can be obtained from Hercules Corp. of Dover, Del. Adhesive layer 18 typically is an acrylic polymer such as can be obtained from H & N Chemical Co. of Totowa, N.J.

Figure 3:
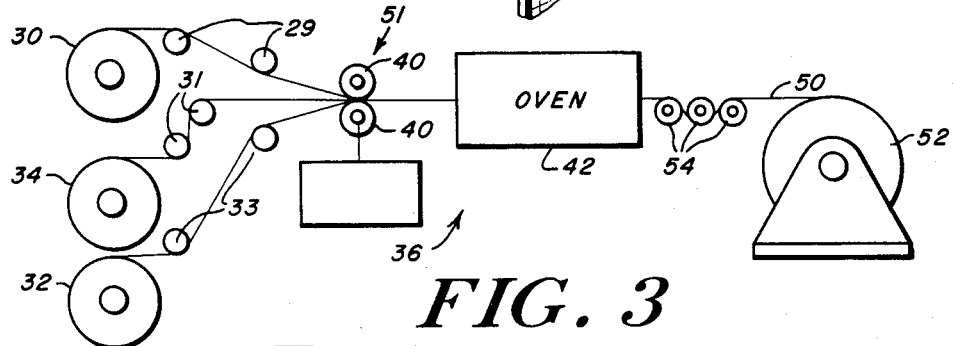
FIG. 3 is a diagrammatic representation of apparatus for forming the backing material of this invention.

The method and apparatus for forming material 10 will now be described with particular reference to FIGS. 3 and 4. Laminating apparatus 51 includes supply rolls 30, 32 and 24, nip rollers 40, oven 42 and master roll 52. Two spaced rolls 30 and 32 of polypropylene film of the desired thickness and having a heat sealable coating are provided at one end of machine 36. Disposed between rolls 30 and 32 at the same end of machine 36 is a third roll 34 of polyester scrim having the desired pattern, thickness and strength. Film from rolls 30 and 32 and roll 34 are simultaneously fed to heated, powered nip rollers 40 where the scrim is sandwiched between film from rolls 32 and 30. Guide rollers 29 are provided for controlling tension on the polypropylene film dispensed from roll 30, while guide rollers 31 and 33 control the tension on the scrim dispensed by roll 34 and the polypropylene dispensed by roll 32 respectively. This sandwich is heated and compressed by rollers 40 to activate the heat sealable coating and is then fed to ovens 42 where the heat sealable coating on the polypropylene film is cured to seal together the layes of polypropylene from rolls 30 to 32, sandwiching the scrim therebetween.

Thereafter, the resulting laminate 50 is accumulated onto a master roll 52. Guide rollers 54 control tension on laminate 50 as it is fed to roll 52.

Figure 4:
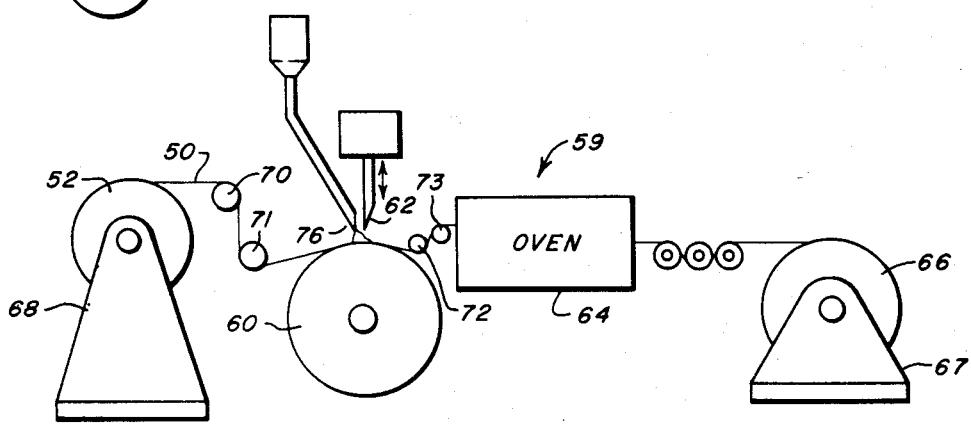
FIG. 4 is a diagrammatic representation of apparatus for applying an adhesive layer to the backing material of this invention.

Adhesive applying apparatus 59 is shown diagrammatically in FIG. 4 and includes application drum 60, metering knife 62, oven 64, accumulating roll 66 and coating head 76. The master roll 52 is removed from the laminating apparatus 51 and is placed in line with apparatus 59 on support 68. Laminate 50 is fed to drum 60 by rollers 70 and 71 and is advanced from drum 60 to oven 64 by rollers 72 and 73. Rollers 71 and 72 hold laminate 50 tightly against the top of drum 60 and the desired adhesive is applied to one surface of laminate 50 through coating head 76. Metering knife 62 is spaced from drum 60 a predetermined distance and controls the thickness of the adhesive layer on laminate 50 in a known manner as the laminate, with adhesive thereon passes thereunder. The laminate having an adhesive layer applied thereto is fed to drying oven 64 where the solvent for the adhesive is dissipated and the adhesive is cured. The resulting adhesive coated laminate is accumulated by roll 66 on a rewind stand 67, and thereafter, this coated laminate is slit to the desired length and width by a known rewind type slitter. A suitable rewind slitter is the Cameron Type 26-3A produced by the Cameron Division of Midland-Ross Corporation of New Brunswick, N.J.

In view of the above description, it is likely that modifications and improvements may occur to those skilled in the art within the scope of this invention. Thus, the above description is intended to be exemplary only, the scope of the invention being defined by the following claims and their equivalents.

What is claimed is:

1. A mirror backing laminate material comprising:
   a first outer layer formed of a plastic material;
   a second outer layer secured to said first outer layer, said second outer layer being formed of a plastic material;
   a central reinforcing scrim disposed between said first and said second outer layers;
   normally hardened means for securing said first outer layer to said second outer layer and for sealingly capturing said central scrim therebetween; and
   an adhesive layer applied to an outer surface of a selected one of said first and said second outer layers for securing said backing laminate material to the back of a mirror.

2. A mirror backing laminate material as recited in claim 1 wherein said central scrim if formed of a polyester.

3. A mirror backing laminate material as recited in claim 1 wherein said first and said second outer layers are heat sealed together.

4. A mirror backing laminate material as recited in any one of claims 1, 2 or 3 capable of withstanding a 400 foot/pound test.

5. A mirror backing laminate material as recited in claim 1 wherein said first and said second outer layers comprise a polypropylene film.

6. A mirror backing laminate material for attachment to the back surface of a mirror to prevent shattering of the mirror, the laminate material comprising:
   a first outer film formed of a plastic material;
   a second outer film, said second outer film being formed of a plastic material;
   a central scrim sandwiched between said first and said second outer layers;
   a normally nontacky, hardened material for bonding said first outer film to said second outer film and for sealingly capturing said scrim therebetween; and
   an adhesive layer applied to an outer surface of a selected one of said first and said second outer films for securing said laminate material to the back of a mirror;
   said mirror backing laminate material being capable of withstanding at least a 400 foot/pound test when applied to the back of a mirror.

7. A method for forming a mirror backing laminate material comprising the steps of:
   providing two outer plastic layers each having a normally hardened heat sealable coating;
   inserting a reinforcing scrim between the two outer layers;
   compressing the scrim between the two outer layers;
   simultaneously with said compressing step, heating the two outer layers to activate the heat sealable coatings thereon; and
   applying a coating of a pressure sensitive adhesive to the outer surface of one of the two outer layers.

8. A mirror backing laminate material capable of withstanding a 400 foot/pound test and formed according to the method of claim 7.

* * * * *